(12) United States Patent
Vandewal (10) Patent No.: US 7,413,062 B2
(45) Date of Patent: Aug. 19, 2008

(54) ELECTRONICALLY CONTROLLED FREQUENCY DEPENDENT DAMPING

(75) Inventor: Bart Vandewal, Alken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 11/900,607

(22) Filed: Sep. 12, 2007

(65) Prior Publication Data

US 2008/0006495 A1    Jan. 10, 2008

Related U.S. Application Data

(62) Division of application No. 10/775,880, filed on Feb. 10, 2004.

(51) Int. Cl.
 *F16F 15/08*    (2006.01)
(52) U.S. Cl. .............................. 188/266.5; 188/322.21; 188/318
(58) Field of Classification Search .............. 167/64.11, 167/64.15–64.17, 64.19, 218; 248/562; 280/6.159, 5.504, 124.106; 188/266.5, 313–314, 188/318, 322.21
See application file for complete search history.

(56) References Cited

U.S. PATENT DOCUMENTS

| 2,902,288 | A |   | 9/1959  | Dill |
| 3,222,047 | A | * | 12/1965 | Franz ........................ 267/64.19 |
| 3,502,347 | A |   | 3/1970  | Busignies |
| 3,625,321 | A |   | 12/1971 | Lutz |
| 3,807,678 | A | * | 4/1974  | Karnopp et al. ............. 248/562 |
| 3,857,580 | A |   | 12/1974 | Keijzer et al. |
| 4,052,088 | A |   | 10/1977 | Nicholls |
| 4,159,106 | A |   | 6/1979  | Nyman |
| 4,333,668 | A |   | 6/1982  | Hendrickson et al. |
| 4,478,431 | A | * | 10/1984 | Muller et al. ............ 280/6.159 |
| 4,546,959 | A |   | 10/1985 | Tanno |
| 4,589,528 | A |   | 5/1986  | Axthammer et al. |
| 4,639,013 | A |   | 1/1987  | Williams et al. |
| 4,655,440 | A | * | 4/1987  | Eckert ..................... 267/64.11 |
| 4,687,187 | A |   | 8/1987  | Bellapadrona |
| 4,695,226 | A |   | 9/1987  | Marchitto et al. |
| 4,702,490 | A |   | 10/1987 | Yamaguchi et al. |
| 4,706,787 | A |   | 11/1987 | Wossner |
| 4,732,244 | A |   | 3/1988  | Verkuylen |
| 4,756,393 | A |   | 7/1988  | Collee et al. |
| 4,786,034 | A |   | 11/1988 | Heess et al. |
| 4,827,416 | A |   | 5/1989  | Kawagoe et al. |
| 4,844,428 | A |   | 7/1989  | Margolis et al. |
| 4,852,863 | A | * | 8/1989  | Breitenbacher et al. ..... 267/218 |
| 4,886,466 | A |   | 12/1989 | Doherty et al. |
| 4,934,731 | A |   | 6/1990  | Hiwatashi et al. |
| 4,936,423 | A | * | 6/1990  | Karnopp ................. 188/266.5 |

(Continued)

FOREIGN PATENT DOCUMENTS

DE    332827    A2    9/1989

*Primary Examiner*—Christopher P Schwartz
(74) *Attorney, Agent, or Firm*—Harness, Dickey & Pierce, PLC (57) ABSTRACT

A gas damper includes a gas pressurized working chamber and valving within the piston to control flow of the gas through the piston. A system is in communication with the working chamber to control the gas pressure within the working chamber in order to control the damping characteristics of the damper. An electronic control unit is utilized to control the opening and closing of the valving within the piston to also control the damping characteristics of the damper.

7 Claims, 8 Drawing Sheets

U.S. PATENT DOCUMENTS

| | | |
|---|---|---|
| 4,999,777 A | 3/1991 | Schussler et al. |
| 5,048,861 A | 9/1991 | Takahashi |
| 5,058,868 A | 10/1991 | Sirven |
| 5,076,404 A | 12/1991 | Gustafsson |
| 5,082,309 A | 1/1992 | Schutzner et al. |
| 5,096,026 A | 3/1992 | Vautour |
| 5,107,969 A | 4/1992 | Klein et al. |
| 5,107,970 A | 4/1992 | Driessen et al. |
| 5,145,205 A | 9/1992 | Takehara et al. |
| 5,154,263 A | 10/1992 | Lizell |
| 5,205,385 A | 4/1993 | Ashiba |
| 5,215,327 A | 6/1993 | Gatter et al. |
| 5,219,152 A | 6/1993 | Derrien et al. |
| 5,263,559 A * | 11/1993 | Mettner .................. 188/266.5 |
| 5,295,563 A | 3/1994 | Bennett |
| 5,324,066 A | 6/1994 | Masamura et al. |
| 5,337,864 A | 8/1994 | Sjostrom |
| 5,348,338 A | 9/1994 | Kuriki et al. |
| 5,428,533 A | 6/1995 | Ogawa |
| 5,477,947 A | 12/1995 | Schalles et al. |
| 5,527,060 A | 6/1996 | Kutsche |
| 5,588,510 A | 12/1996 | Wilke |
| 5,678,846 A | 10/1997 | Davis |
| 5,682,980 A * | 11/1997 | Reybrouck ............... 280/5.504 |
| 5,743,553 A | 4/1998 | Nagel et al. |
| 5,781,873 A | 7/1998 | Sasaki |
| 5,873,437 A | 2/1999 | Danek |
| 5,924,528 A | 7/1999 | Vermolen et al. |
| 5,957,252 A | 9/1999 | Berthold |
| 5,971,117 A | 10/1999 | Grundei et al. |
| 6,000,702 A | 12/1999 | Streiter |
| 6,003,644 A | 12/1999 | Tanaka |
| 6,032,933 A | 3/2000 | Beck |
| 6,250,658 B1 * | 6/2001 | Sakai .................. 280/124.106 |
| 6,266,590 B1 | 7/2001 | Kutscher et al. |
| 6,311,110 B1 * | 10/2001 | Ivers et al. .................... 701/37 |
| 6,592,108 B1 | 7/2003 | Lude |
| 6,612,410 B1 | 9/2003 | Antonovsky |
| 6,637,555 B2 * | 10/2003 | Kruckemeyer et al. ... 188/266.5 |

* cited by examiner

_Figure - 5_

_Figure - 6_

ELECTRONICALLY CONTROLLED FREQUENCY DEPENDENT DAMPING

CROSS-REFERENCE TO RELATED APPLICATIONS

This application is a divisional of U.S. patent application Ser. No. 10/775,880 filed on Feb. 10, 2004. The disclosure of the above application is incorporated herein by reference.

FIELD OF THE INVENTION

The present invention relates generally to dampers or shock absorbers adapted for use in a suspension system such as the suspension system used for automotive vehicles. More particularly, the present invention relates to a shock absorber which utilizes a gas rather than hydraulic fluid as the damping medium and electronic controls which adjust the damping characteristics of the shock absorber based upon inputs from one or more sensors.

BACKGROUND OF THE INVENTION

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to a piston rod which extends through the pressure tube to be connected to the sprung portion of the vehicle. The piston divides the pressure tube into an upper working chamber and a lower working chamber both of which are typically filled with a hydraulic liquid. Because the piston is able, through valving, to limit the flow of the hydraulic liquid between the upper and the lower working chambers when the shock absorber is compressed or extended, the shock absorber is able to produce a damping force which counteracts the vibration which would otherwise be transmitted from the unsprung portion of the vehicle to the sprung portion of the vehicle. In a dual tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion to the sprung portion of the vehicle.

Shock absorbers filled with hydraulic liquid have met with continuous success throughout the automotive industry. While meeting with success in the automotive industry, hydraulic liquid filled shock absorbers are not without problems. One problem associated with the prior art hydraulic liquid shock absorbers is their lack of ability to change the damping characteristics in response to the frequency of vibration. In order to overcome this deficiency, complex systems have been developed to produce hydraulic liquid filled shock absorbers which are relatively soft for high frequency vibrations while being relatively stiff for low frequency vibrations. Other problems associated with the prior art hydraulic liquid filled shock absorbers include the variability in their damping forces due to the temperature changes of the hydraulic liquid. As the temperature of the hydraulic liquid changes, the viscosity of the liquid also changes which significantly affects the damping force characteristics of the liquid. In addition, any aeration of the hydraulic liquid during operation adversely affects the operation of the damper due to the introduction of a compressible gas into the non-compressible hydraulic liquid. Finally, the hydraulic liquid adds to the weight of the shock absorber as well as presenting environmental concerns regarding the use of the hydraulic liquid.

In an effort to overcome the problems with hydraulic liquid filled dampers, the industry has designed compressed gas, preferably air, dampers. The use of a gas and particularly air as a damping medium produces a frequency dependent damper or shock absorber which is less sensitive to temperature changes when compared to the hydraulic liquid dampers. These air dampers are not adversely affected by aeration over time, they are lower in weight and they are environmentally friendly due to the elimination of the hydraulic liquid.

The continued development of these gas or air dampers has been directed towards the tunability of these dampers. The gas or air damper is inherently frequency dependent due to the compressibility of the damping medium. The further development of these dampers has been directed towards varying the damping characteristics in relation to one or more vehicle parameters.

SUMMARY OF THE INVENTION

The present invention provides the art with a gas or air damper which is tunable in relation to one or more monitored vehicle parameters. An electronic control unit monitors the various operating parameters of the vehicle and tunes the gas or air damper between soft damping and firm damping to provide an optimally performing shock absorber for the current operating conditions of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
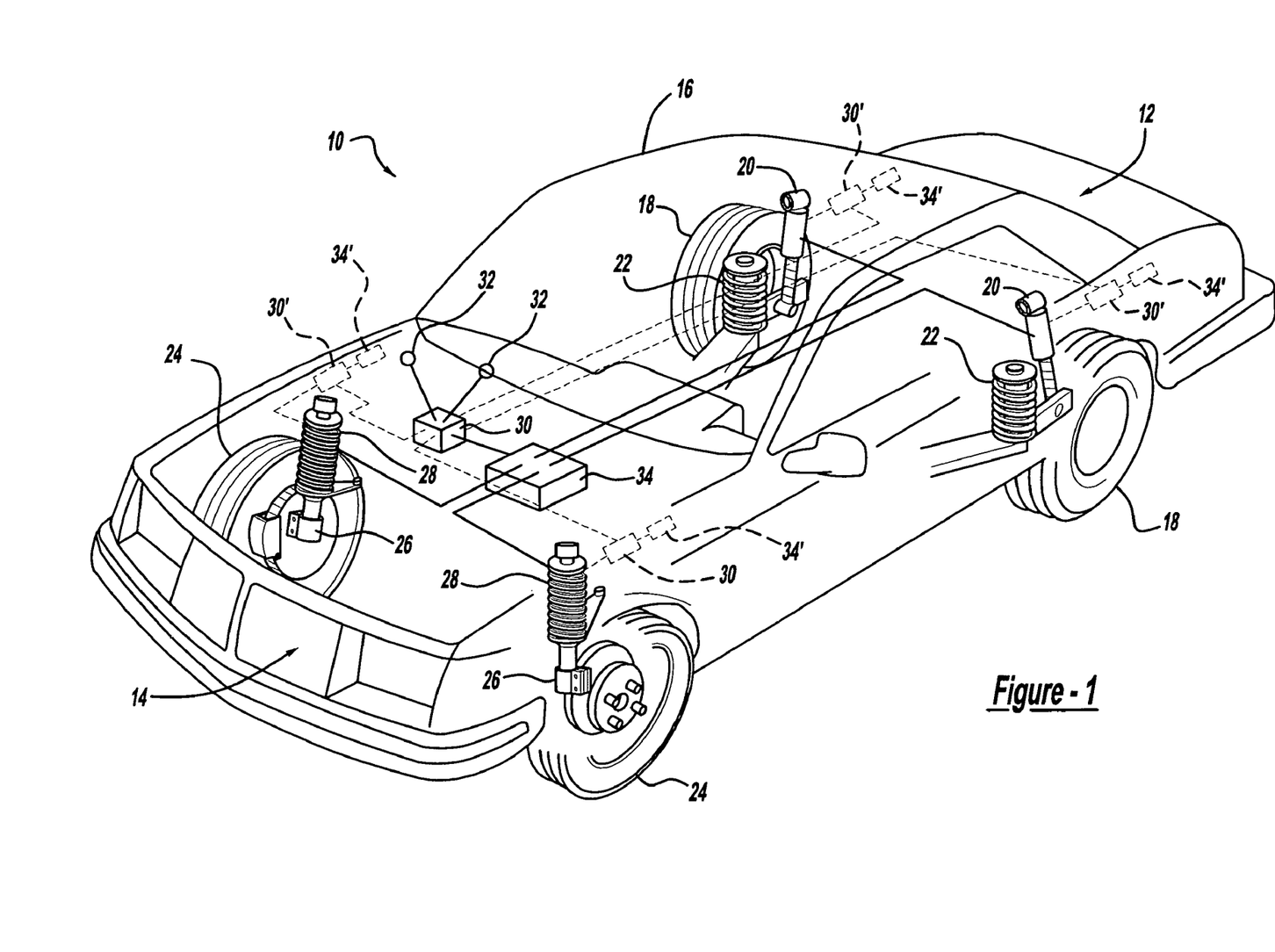
FIG. 1 is an illustration of an automobile incorporating the unique tunable gas filled frequency damper in accordance with the present invention.

Referring now to the drawings in which like reference numerals designate like or corresponding parts throughout the several views, there is shown in FIG. 1 a vehicle incorporating a suspension system having the electronically controlled frequency dependent dampers in accordance with the present invention which is designated generally by the reference numeral 10. Vehicle 10 includes a rear suspension 12, a front suspension 14 and a body 16. Rear suspension system 12 includes a pair of independent suspensions adapted to operatively support a pair of rear wheels 18. Each rear independent suspension is attached to body 16 by means of a shock absorber 20 and a helical coil spring 22. Similarly, front suspension 14 includes a pair of independent suspensions adapted to operatively support a pair of front wheels 24. Each independent front suspension is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12 and 14 respectively) with respect to the sprung portion (i.e., body 16) of vehicle 10. While vehicle 10 has been depicted as a passenger vehicle having independent front and rear suspensions, shock absorbers 20 and 26 may be used with other types of vehicles having other types of suspensions and springs or in other applications including, but not limited to, vehicles incorporating air springs instead of coil springs, leaf springs instead of coil springs, non-independent front and/or non-independent rear suspension systems. One of the unique features of the present invention is that if it is combined with an air spring, the air spring and the shock absorber can be separate units. There is no need to provide communication between the air spring and the shock absorber but it may provide benefits as detailed below. Further, the term Ashock absorber≠ as used herein is meant to refer to dampers in general and thus will include MacPherson struts, spring seat units as well as other shock absorbers known in the art.

Vehicle 10 further includes an electronic control unit 30 which monitors one or more sensors 32. Sensors 32 can monitor the loading conditions of vehicle 10, the road conditions over which vehicle 10 is traveling, acceleration of vehicle 10 and/or braking of vehicle 10. In addition, one of sensors 32 can be utilized to receive input from the driver requesting control unit 30 to provide a specified damping characteristic. Electronic control unit 30 is in communication with a source of pressurized gas/air 34 which is in turn in communication with each shock absorber 20 and each shock absorber 26. When control unit 30 issues a command in response to a sensed condition by sensors 32, pressurized gas/air is provided to or removed from one or more shock absorbers 20 and 26 to provide the pre-programmed damping characteristics for vehicle 10 as described below. While control unit 30 is being shown as controlling all four shock absorbers 20 and 26, it is within the scope of the present invention to have a dedicated electronic control unit 30', as shown in phantom in FIG. 1, for each shock absorber 20 and 26. When multiple control units 30' are being utilized, control units 30' may or may not communicate with each other. In addition, while the source of pressurized gas/air 34 is shown as communicating with all four shock absorbers 20 and 26, it is within the scope of the present invention to have a dedicated supply of compressed gas/air 34', as shown in phantom in FIG. 1, for each shock absorber 20 and 26.

Figure 2:
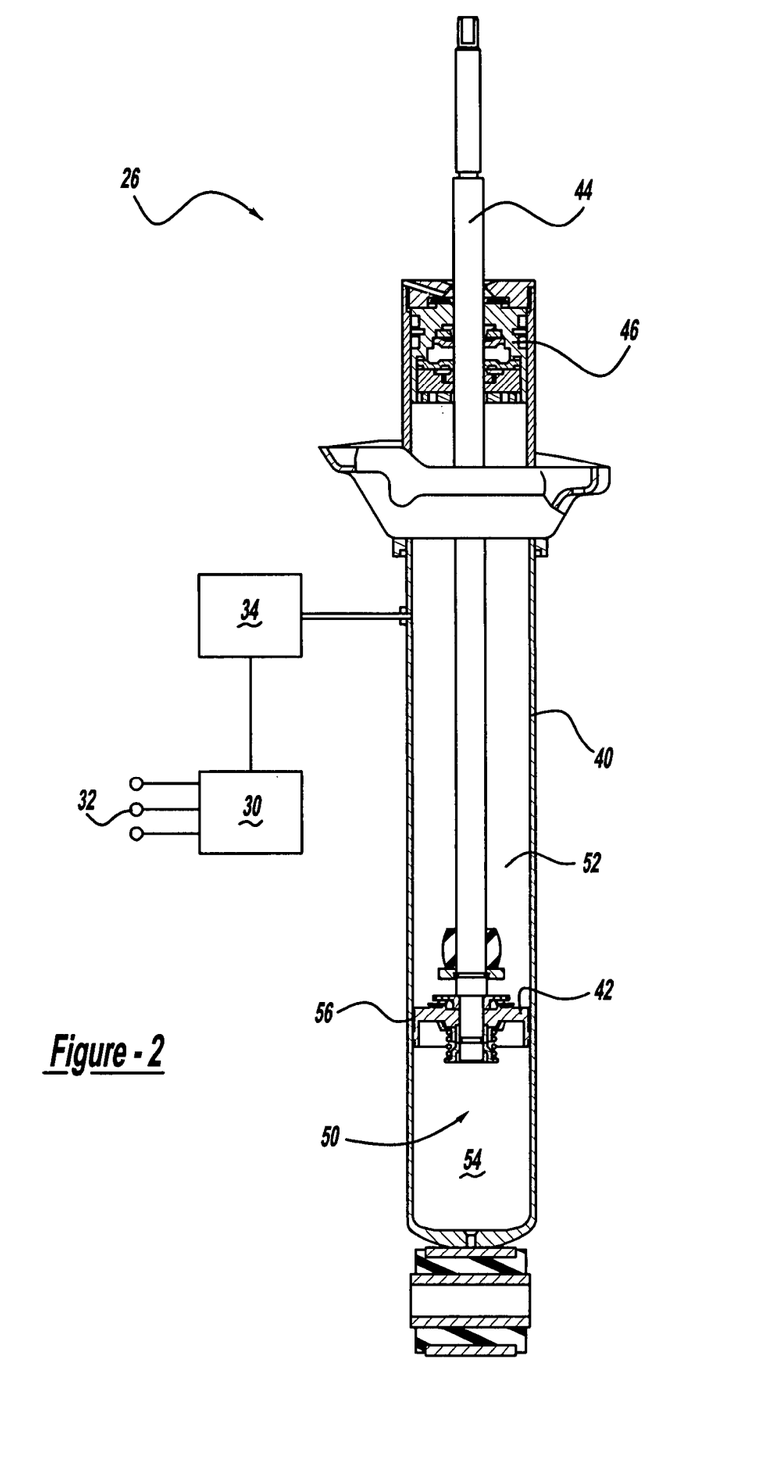
FIG. 2 is a side view, partially in cross-section of the unique gas filled tunable shock absorber in accordance with the present invention.

Referring now to FIG. 2, front shock 26 is shown in greater detail with electronic control unit 30 and the source of pressurized gas/air 34. While FIG. 2 shows only front shock absorber 26, it is to be understood that rear shock absorber 20 is also designed as an electronically controlled frequency dependent damper in accordance with the present invention. Shock absorber 20 only differs from rear shock absorber 26 in the way it is adapted to be connected to the sprung and unsprung portions of vehicle 10 and in the dimension of the various components. Shock absorber 26 comprises a pressure tube 40, a piston assembly 42, a piston rod 44 and a rod guide assembly 46.

Pressure tube 40 defines a working chamber 50. Working chamber 50 is filled with a gas, preferably air, at a specified pressure to act as the damping medium. Piston assembly 42 is slidably disposed within working chamber 50 and divides working chamber 50 into an upper working chamber 52 and a lower working chamber 54. A seal 56 is disposed between piston assembly 42 and pressure tube 40 to permit sliding movement of piston assembly 42 with respect to pressure tube 40 without generating unique frictional forces as well as to seal upper working chamber 52 from lower working chamber 54. Piston rod 44 is attached to piston assembly 42 and extends through upper working chamber 52 and through rod guide assembly 46 which closes the upper end of pressure tube 40. The end of piston rod 44 opposite to piston assembly 42 is adapted to be secured to the sprung portion of vehicle 10. The end of pressure tube 40 opposite to rod guide assembly 46 is adapted to be connected to the unsprung portion of vehicle 10. While piston rod 44 is shown adapted for being connected to the sprung portion of vehicle 10 and pressure tube 40 is adapted for being connected to the unsprung portion of vehicle 10, due to the use of a gas as the damping medium, it is within the scope of the present invention to have piston rod 44 adapted to attach to the unsprung portion of vehicle 10 and have pressure tube 40 adapted to attach to the sprung portion of vehicle 10 if desired.

Figure 3:
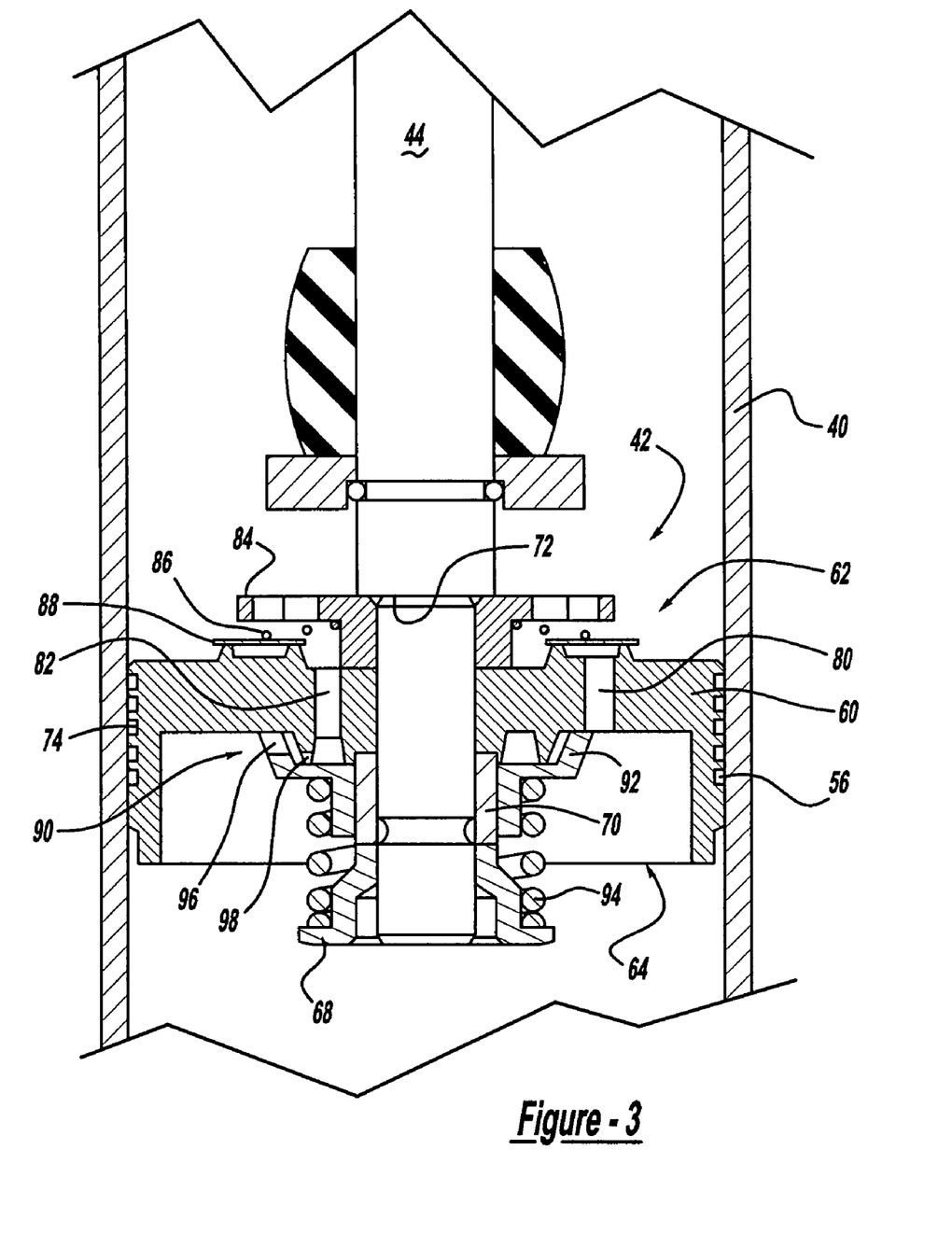
FIG. 3 is an enlarged cross-sectional view of the valving system incorporated into the frequency dependent damper shown in FIG. 2.

Referring now to FIGS. 2 and 3, piston assembly 42 comprises a piston body 60, a compression valve assembly 62 and a rebound or extension valve assembly 64. Piston rod 44 defines a reduced diameter section 66 onto which compression valve assembly 62, piston body 60 and rebound valve assembly 62 are located. A nut 68 and a spacer 70 secure piston assembly 42 onto section 66 of piston rod 44 with compression valve assembly 62 abutting a shoulder 72 located on piston rod 44, piston body 60 abutting compression valve assembly 62, spacer 70 with nut 68 abutting piston body 60, and extension valve assembly 64 being disposed between piston body 60 and nut 68.

Seal 56 is an annular seal located between piston body 60 and pressure tube 40. Seal 56 is held in position by a plurality of grooves 74 formed in piston body 60. Seal 56 permits sliding movement of piston body 60 with respect to pressure tube 40 without generating undue frictional forces as well as providing the seal between upper working chamber 52 and lower working chamber 54. This dual roll played by seal 56 is extremely important for pneumatic shock absorber 26 due to the high pressures generated in working chambers 52 and 54 and the continued need for limiting the sliding forces generated between piston assembly 42 and pressure tube 40.

Piston body 60 defines a plurality of compression passages 80 and a plurality of extension passages 82. During a compression movement of shock absorber 20, gas flows between lower working chamber 54 and upper working chamber 52 through passages 80 as described below. During an extension movement of shock absorber 20, gas flows between upper working chamber 52 and lower working chamber 54 through passages 82 as described below.

Compression valve assembly 62 comprises a stop 84, a valve spring 86 and a valve plate 88. Valve plate 88 is biased against piston body 60 by valve spring 86 which reacts against stop 84 to normally close the plurality of compression passages 80. During a compression stroke of shock absorber 20, the gas in lower working chamber 54 is compressed including the gas within the plurality of compression passage 80. Extension valve assembly 64 includes a constantly open flow path 90 which will allow for a limited flow of gas between lower working chamber 54 and upper working chamber 52 as the gas in lower working chamber 54 is compressed. The compressed gas in compression passages 80 exerts a force on valve plate 88 which will remain seated closing passages 80 until the force created by the gas pressure overcomes the biasing of valve spring 86 unseating valve plate 88 from piston body 60 allowing additional gas to flow from lower working chamber 54 to upper working chamber 52 through passages 80. Thus, a two step damping force is created during a compression stroke. The initial movement and/or relatively small movements of piston assembly 42 will cause the gas to flow only through flow path 90 and extension passages 82. When the movement exceeds a predetermined speed or value and/or during relatively large movements of piston assembly 42, compression valve assembly 62 will open allowing gas flow through both passages 80 and 82 through flow path 90. This two step damping force switches from a relatively firm damping to a relatively soft damping.

Extension valve assembly 64 comprises a sliding seat 92 and a valve spring 94. Valve seat 92 is biased against piston body 60 by valve spring 94 which reacts against retaining nut 68. Seat 92 defines one or more passages 96 which in combination with one or more passages 98 defined by piston body 60 create flow path 90. During an extension stroke of shock absorber 20, the gas in upper working chamber 52 is compressed including the gas within the plurality of extension passages 82. The plurality of extension passages 82 and flow path 90 define a route for the gas between upper working chamber 52 and lower working chamber 54 which is always open and thus will allow a limited flow of the gas between upper working chamber 52 and lower working chamber 54 as the gas in upper working chamber 52 is compressed. The compressed gas in extension passages 82 exerts a force on valve seat 92 which will remain seated closing passages 82 (other than flow path 90) until the force created by the gas pressure overcomes the biasing load of valve seat 92 unseating valve seat 92 from piston body 60 by sliding valve seat 92 down along spacer 70 allowing additional gas to flow from upper working chamber 52 to lower working chamber 54 through passages 82. Thus a two step damping force is created during an extension stroke. The initial movement and/or relatively small movements of piston assembly 42 will cause the gas to flow only through extension passages 82 through flow path 90. When the extension movement exceeds a predetermined speed or value and/or during large movements of piston assembly 42, extension valve assembly 64 will open allowing gas flow through extension passages 82 thus providing a blow off feature. The two step damping force switches from a relatively firm damping to a relatively soft damping and/or providing a blow off feature.

Gas filled shock absorber 26 described above provides a frequency dependant damper which can be tuned to specific performance requirements for specific applications. During compression and extension movements of a prior art liquid filled shock absorber, the liquid moves from either the lower working chamber to the upper working chamber or the upper working chamber to the lower working chamber. This provides frequency vs. dissipation response curves which continue to rise at an ever increasing rate as the frequency of the damped vibration increases leading to an exponential shape curve at higher frequencies. The present invention provides the suspension system designer the opportunity to flatten the shape of this curve as shown in FIG. 4.

The flattening out of this curve is due to the compressibility of a gas versus the non-compressibility of a liquid. During low speed or low frequency movements of shock absorber 26, minimal compression of the gas occurs and movement of piston assembly 42 transfers gas between lower and upper working chambers 52, 54 of pressure tube 40. As the frequency of the movement increases, compression of the gas will also increase, changing the dissipation as the compressed gas begins to work like a gas spring. The specific point at which the gas shock curve bends away from the liquid shock curve can be tuned by selecting different sizes for passages 80 and 82. In addition to changing the shape of the curve as shown in FIG. 4, the height of the curve can be tuned by changing the initial pressure within working chamber 50.

The dual points of tunability for shock absorber 26 allows for tuning shock absorber 26 to both the body natural frequency and the wheel suspension natural frequency to optimize performance of shock absorber 26 at both of these frequencies. The prior art liquid shock absorbers could be tuned to a specific frequency response but the remaining frequency responses were a result of the shape of the curve which could not be altered.

Figure 4:
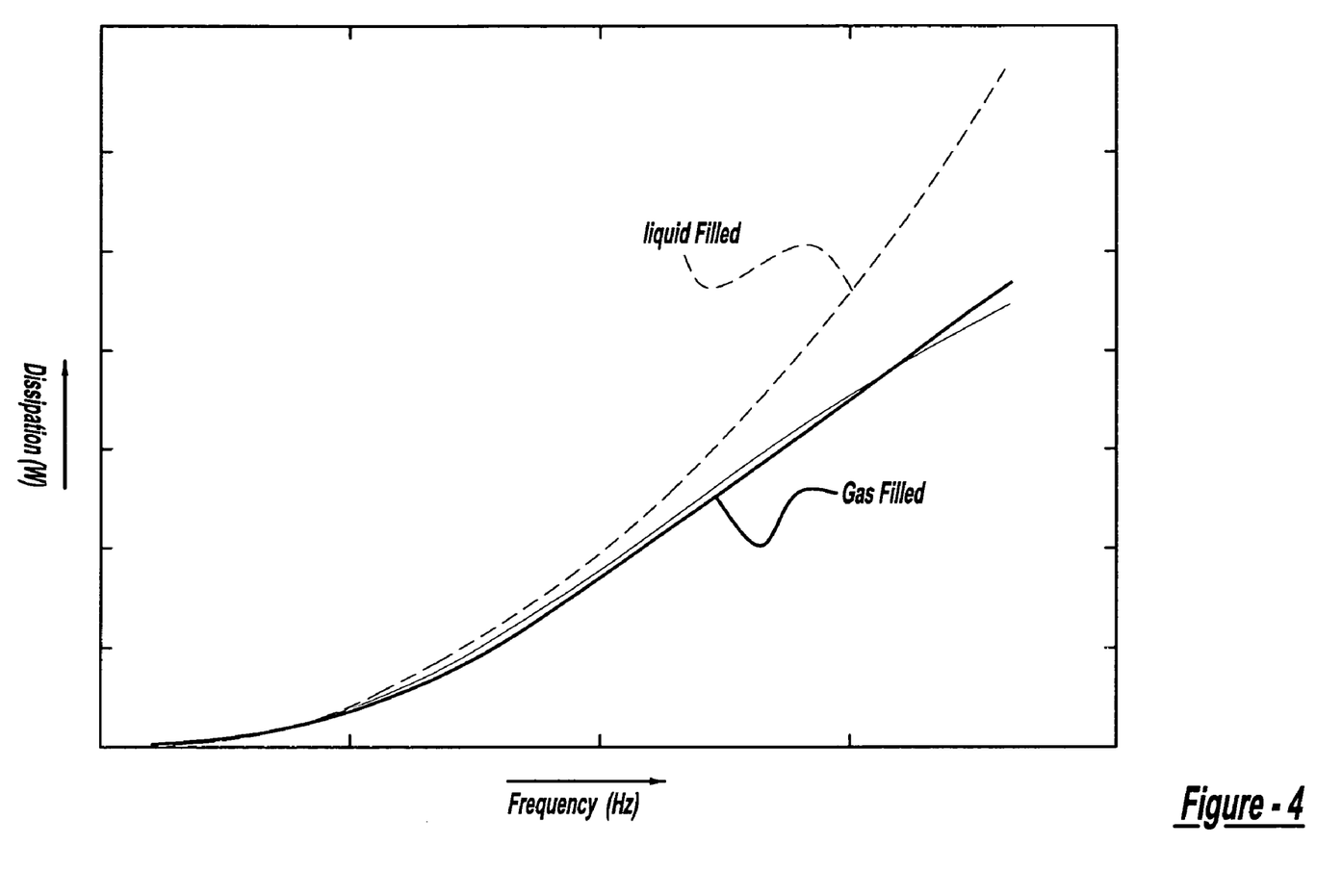
FIG. 4 is a graph showing frequency versus dissipation for both a liquid filled prior art shock absorber and the gas filled shock absorber according to the present invention.

As stated above, in addition to changing the shape of the curve as shown in FIG. 4 by selecting different sizes for passages 80 and 82, the height of the curve can be tuned by changing the pressure within chamber 50. Thus, by controlling the pressure within chamber 50 on a continuous basis, it is possible to tune shock absorber 20 to match specific vehicle operation parameters. This control of the pressure within working chamber 50 can be accomplished by electronic control unit 30, sensors 32 and pressurized gas/air source 34. For example, the control of the initial pressure within chamber 50 can be used to have more damping with a higher payload of vehicle 10 and to have less damping at a lower payload. In this way, a better compromise can be achieved between comfort and handling in all loading conditions.

One additional method which can be utilized to control the increase in pressure within chamber 50 is to size piston rod 44 to a specific size for controlling this pressure. In a vehicle which does not include a vehicle leveling system, increased loading of the vehicle will cause springs 22 and 28 to compress, reducing the length of shock absorbers 20 and 26. When shock absorber 26 decreases in length, piston rod 44 is pushed further into working chamber 50 to displace the compressed gas within chamber 50 thus increasing the pressure within chamber 50. By controlling the diameter of piston rod 44, the increase of pressure chamber 50 can be controlled. When the control of the pressure within chamber 50 is designed to be by the specification of the size of piston rod 44, electronic control unit 30, sensors 32 and the source of pressurized gas/air 34 can be eliminated.

Figure 5:
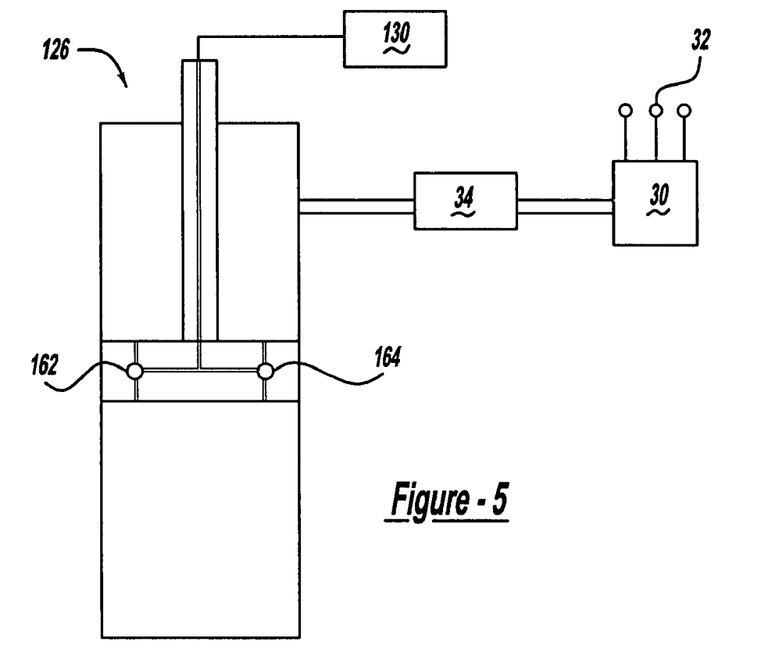
FIG. 5 is a schematic view of a unique gas filled tunable shock absorber in accordance with another embodiment of the present invention.

Referring now to FIG. 5, a schematic view of a unique tunable shock absorber 126 in accordance with another embodiment of the present invention is illustrated. As stated above, electronic control unit 30, sensors 32 and pressurized gas/air source 34 can tune the height of the curve shown in FIG. 4. Also stated above is that the specific point at which the gas shock curve bends away from the liquid shock curve in FIG. 4 can be tuned by selecting different sizes for passages 80 and 82. FIG. 5 illustrates a shock absorber 126 that in addition to electronic control unit 30, sensors 32 and source 34, it includes an electronic control unit 130 which controls a variable orifice compression valve assembly 162 and a variable orifice extension valve assembly 164. Valve assemblies 162 and 164 can be varied by changing passages 80 and 82 by changing the preloads for the valving system, and/or by other means known in the art. In addition, valve assemblies 162 and 164 can be replaced by a single two-way variable valve if desired. Shock absorber 126 is the same as shock absorber 26 except that valve assembly 162 replaces valve assembly 62, valve assembly 164 replaces valve assembly 64 and access to valve assemblies 162 and 164 is provided through piston rod 44. Thus, the internal pressure within shock absorber 126 can be controlled by electronic control unit 30 and the size of passages 80 and 82 can be controlled by electronic control unit 130 to provide complete tunability to shock absorber 126. Electronic control unit 130 can use the output of sensors 32, additional sensors 32 can be utilized and electronic control unit 130 can be integrated into electronic control unit 30 if desired.

Figure 6:
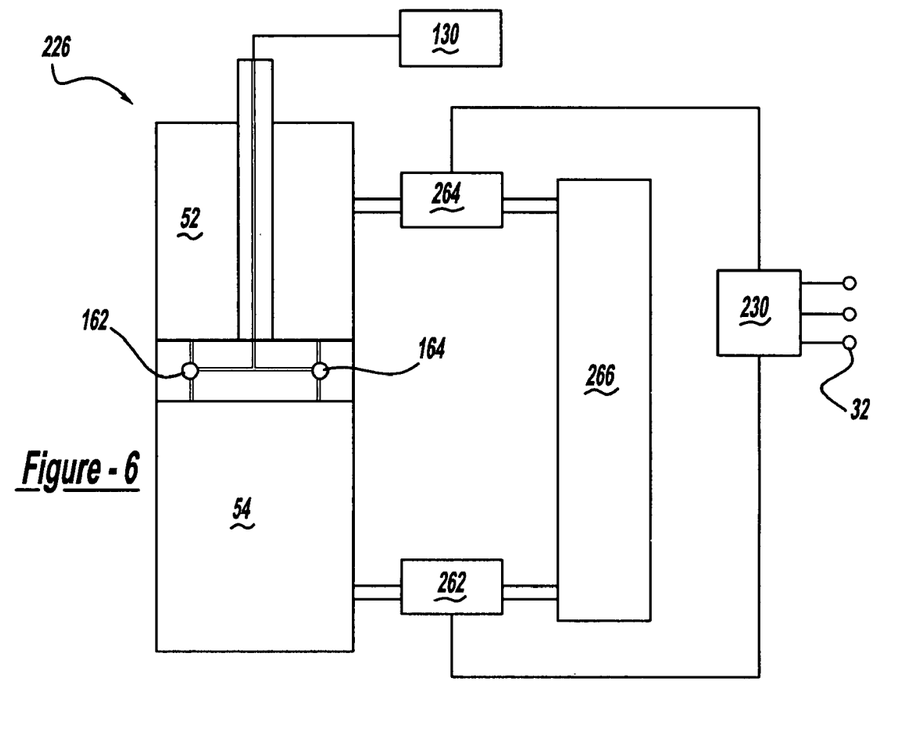
FIG. 6 is a schematic view of a unique gas filled tunable shock absorber in accordance with another embodiment of the present invention.

Referring now to FIG. 6, a schematic view of a unique tunable shock absorber 226 in accordance with another embodiment of the present invention is illustrated. As stated above, the flattening of the curve in FIG. 4 is due to the compressibility of the gas versus the non-compressibility of a liquid. FIG. 6 illustrates shock absorber 226 that includes an electric control unit 230, a compression valve 262, an extension valve 264 and a reservoir volume 266. Shock absorber 226 is the same as shock absorber 26 except that electronic control unit 30 and pressure source 34 have been replaced by electronic control unit 230, valves 262 and 264 and reserve volume 266. With valves 262 and 264 closed, shock absorber 226 acts identical to shock absorber 26 described above. When it is desired to change the compression characteristics in lower working chamber 54, compression valve 262 is opened increasing the volume of lower working chamber 54 changing the compression characteristics of the gas within lower working chamber 54. With a larger volume to compress, the gas compression will be at a lower rate. When it is desired to change the extension characteristics in upper working chamber 52, extension valve 264 is opened increasing the volume of upper working chamber 52. With a larger volume to compress, the gas compression will be at a lower rate. Electronic control unit 230 controls the opening and closing of valve 262 and 264 in response to inputs received from sensors 32. It is to be understood that one or both valves 262 and 264 could be variably controlled valves to control the gas compression characteristics and that both valves 262 and 264 could be opened simultaneously if desired. It is also to be understood that electronic control unit 30, pressure source 34, electronic control unit 130 and valves 162 and 164 could be included with shock absorber 226 if desired.

Figure 7:
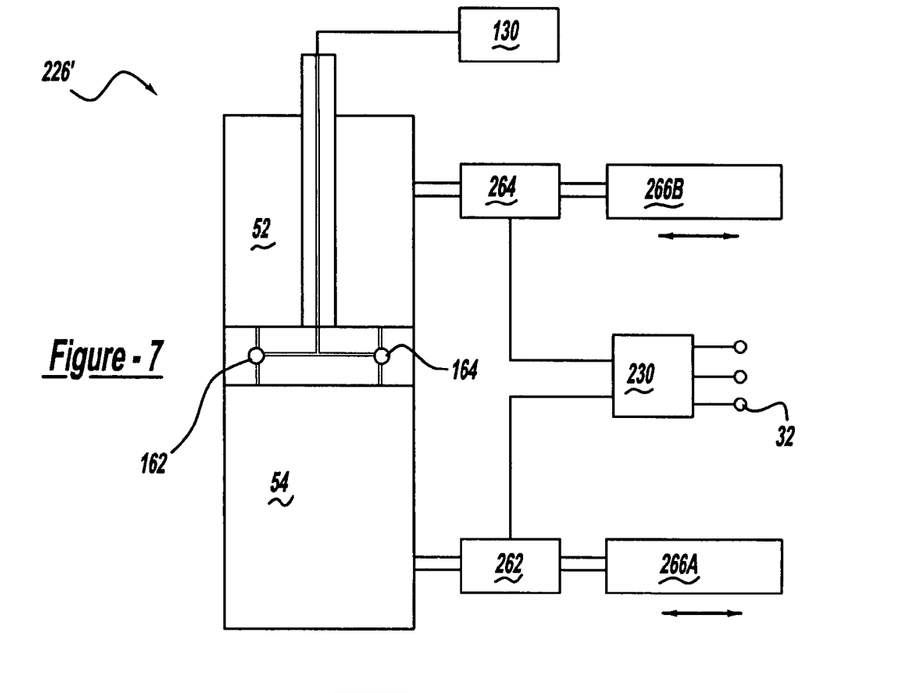
FIG. 7 is a schematic view of a unique gas filled tunable shock absorber in accordance with another embodiment of the present invention.

Referring now to FIG. 7, a schematic view of a unique tunable shock absorber 226' in accordance with another embodiment of the present invention is illustrated. Shock absorber 226' is the same as shock absorber 226 except that reservoir volume 266 is replaced by compression reservoir 266A and extension reservoir 266B. The separation of the reservoir allows for the independent control for both compression and extension strokes for shock absorber 226'. The operation and function for shock absorber 226' is the same as that described above including the possibility of adding unit 30, source 34, unit 130 and valves 162, 164.

Figure 8:
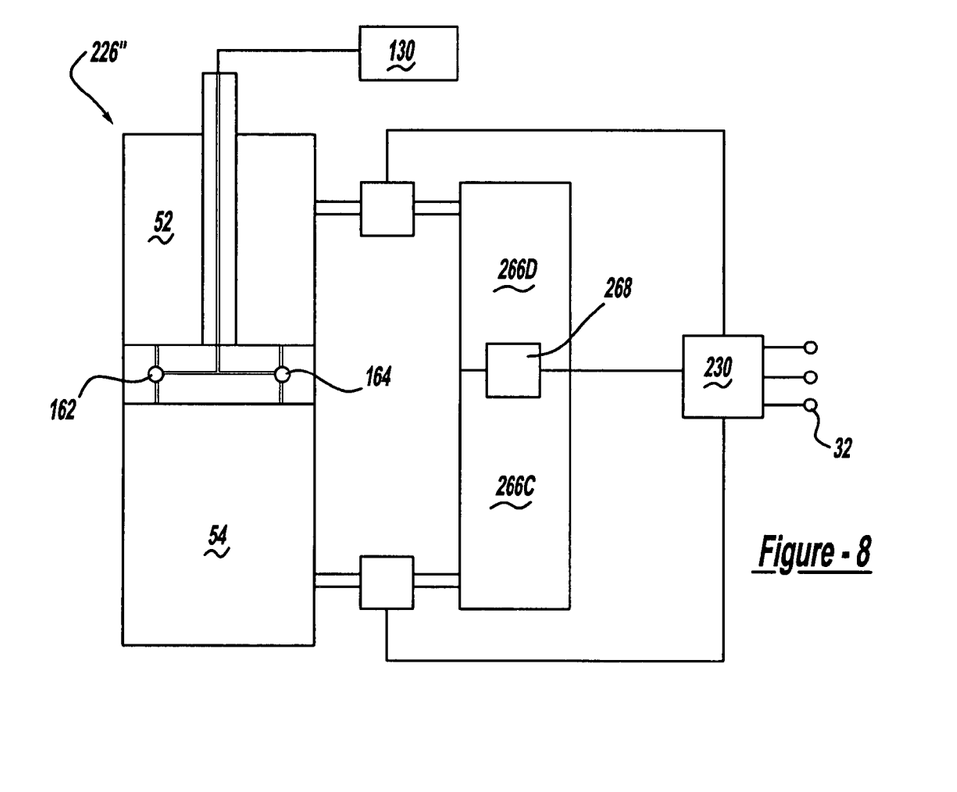
FIG. 8 is a schematic view of a unique gas filled tunable shock absorber in accordance with another embodiment of the present invention.

Referring now to FIG. 8, a schematic view of a unique tunable shock absorber 226" in accordance with another embodiment of the present invention is illustrated. Shock absorber 226" is the same as shock absorber 226 except that reservoir 266 is divided in half with a reservoir valve 268 controlling the flow of gas between a compression volume 266C and an extension volume 266D. Reservoir valve 268 is controlled by electronic control unit 230. The division of reservoir 266 allows for the control of the amount of independent operation during a compression stroke and an extension stroke. Valve 268 can be an on/off valve or it can be a variably controlled valve. The operation and function for shock absorber 226" is the same as that described above including the possibility of adding unit 30, source 34, unit 130 and valves 162, 164.

Figure 9:
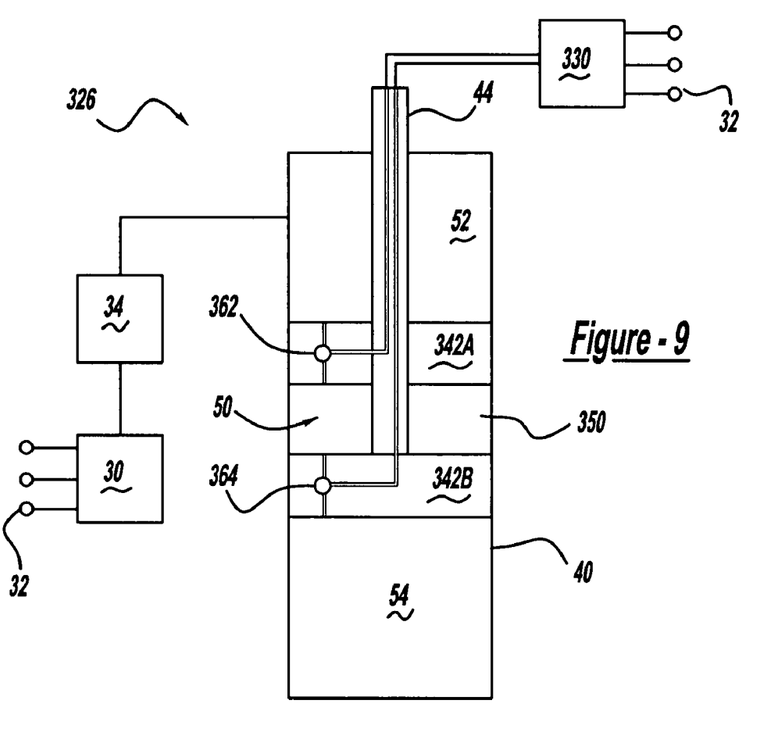
FIG. 9 is a schematic view of a unique gas filled tunable shock absorber in accordance with another embodiment of the present invention.

Referring now to FIG. 9, a schematic view of a unique tunable shock absorber 326 in accordance with another embodiment of the present invention is illustrated. Shock absorber 326 is the same as shock absorber 26 except that piston assembly 42 has been replaced by piston assembly 342A and 342B. Piston assemblies 342A and 342B are each slidably disposed within working chamber 50 and they divide working chamber 50 into upper working chamber 52, lower working chamber 54 and intermediate working chamber 350. Each piston assembly 342A and 342B include the sealing required between the piston and pressure tube 40. Piston rod 44 is attached to both piston assemblies 342A and 342B. Piston assembly 342A includes an upper variably controllable valve assembly 362 and piston assembly 342B includes a lower variably controllable valve assembly 364. Access to valves 362 and 364 is provided through piston rod 44. Control for valves 362 and 364 is through an electronic control unit 330 which is in communication with sensors 32 and valves 362 and 364. Valve assemblies 362 and 364 can be varied by changing the size of the flow path through them, by changing the preloads for the valving systems or by other means known in the art. When it is desired to control the compression characteristics within working chamber 50 and thus the damping characteristics for shock absorber 326, varying the flow through valve assemblies 362 and 326 will change the performance in rebound and compression considerably. It is also to be understood that electronic control unit 30 and pressure source 34 can be included with shock absorber 320 if desired.

Figure 10:
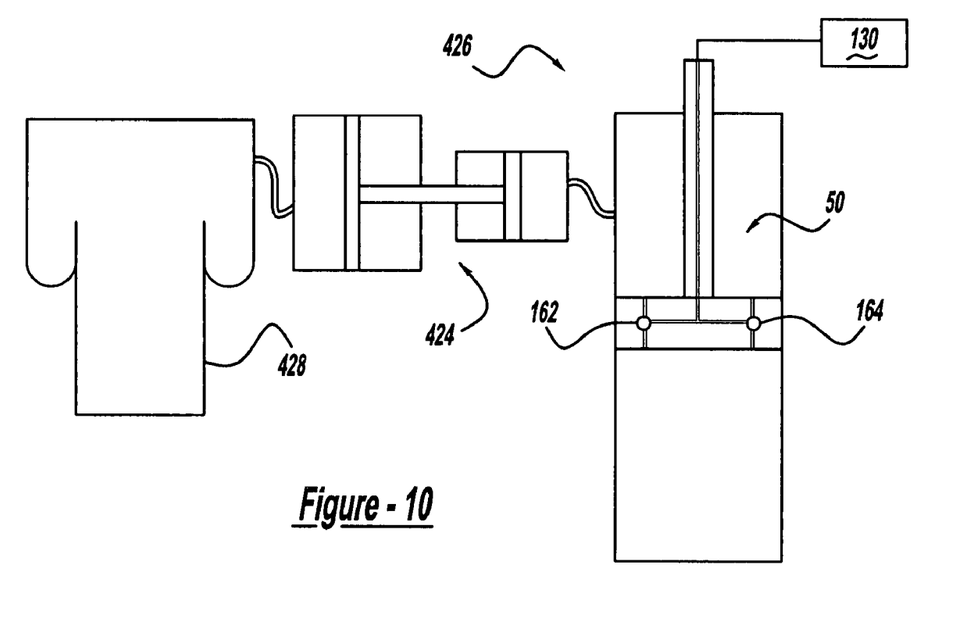
FIG. 10 is a schematic view of a unique gas filled tunable shock absorber in accordance with another embodiment of the present invention.

Referring now to FIG. 10, a schematic view of a unique tunable shock absorber 426 in accordance with another embodiment of the present invention is illustrated. When vehicle 10 utilizes an air spring 428 in place of coil springs 28 and/or 22, the opportunity exists to have the air pressure within the air spring control the damping characteristics for shock absorber 426. This opportunity exists because a heavier loaded vehicle will create a higher air pressure within air spring 428.

Shock absorber 426 includes a booster 424 which is in communication with both working chamber 50 and the pressure within air spring 428. While shock absorber 426 is illustrated having booster 424, it is within the scope of the present invention to have air spring 428 communicate directly with working chamber 50 if desired. When booster 424 is used, the relative sizes between the pistons of booster 424 will determine the amount of boost of the pressure provided to working chamber 50. This boost can be either an increase in pressure or a decrease in pressure if desired. The connection to the pressure of air spring 428 and the incorporation of booster 424 replaces unit 30, sensors 32 and source 34. The operation and function of shock absorber 426 is the same as that described above for shock absorber 26. In addition, electronic control unit 130 and valves 162 and 164 can be included with shock absorber 426 if desired.

Figure 11:
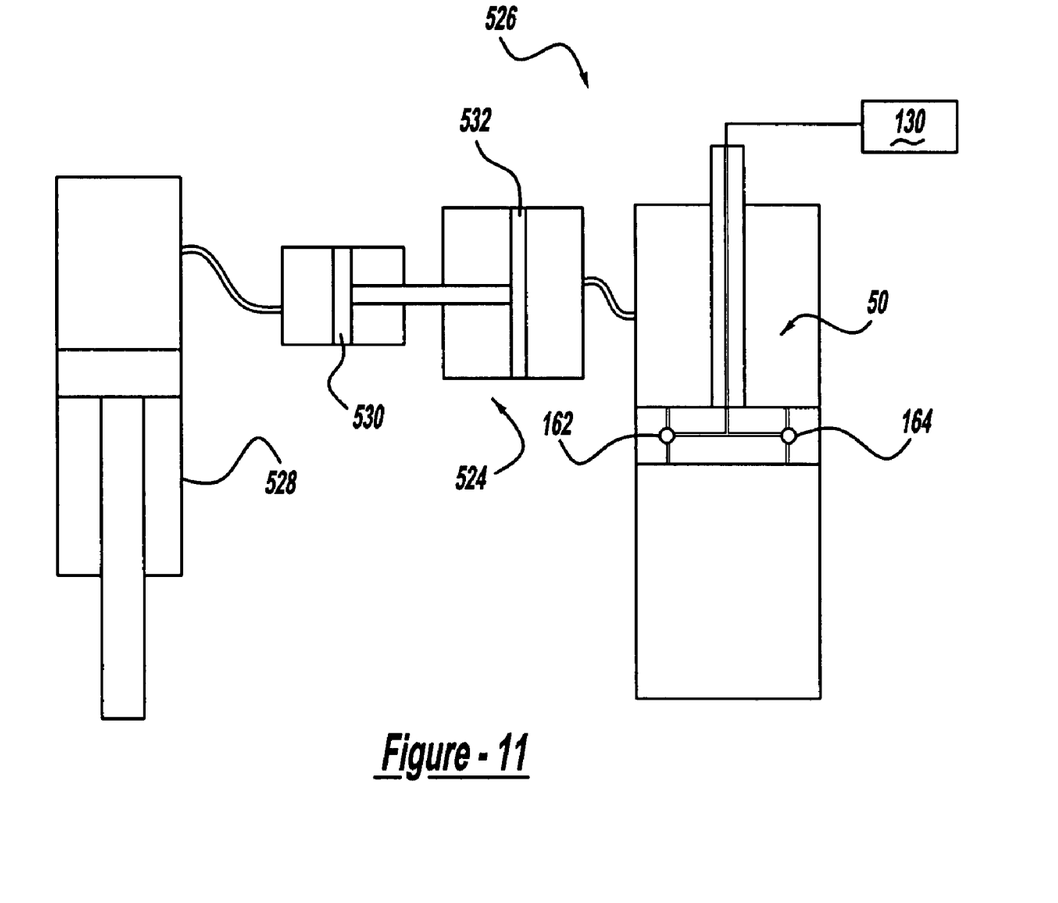
FIG. 11 is a schematic view of a unique gas filled tunable shock absorber in accordance with another embodiment of the present invention.

Referring now to FIG. 11, a schematic view of a unique tunable shock absorber 526 in accordance with another embodiment of the present invention is illustrated. When vehicle 10 utilizes a vehicle leveling system that utilizes a hydraulic activator 528, the pressure of the hydraulic fluid within activator 528 can be utilized to control the damping characteristics for shock absorber 526. This opportunity exists because a heavier loaded vehicle will require a higher hydraulic fluid pressure within activator 528 to level the vehicle.

Shock absorber 526 includes a pressure converter 524 which is in communication with both working chamber 50 and the hydraulic pressure within activator 528. Pressure converter 524 includes a hydraulic cylinder 530 and an air cylinder 532 connected together. The relative sizes between cylinders 530 and 532 will determine the relationship between the hydraulic pressure and the air pressure. This relationship can be either a decrease in pressure or an increase in pressure from the hydraulic pressure. The connection to the pressure within hydraulic actuator 528 and the incorporation of converter 524 replaces unit 30, sensors 32 and source 34. The operation and function of shock absorber 526 is the same as that described above for shock absorber 26. In addition, electronic control unit 130 and valves 162 and 164 can be included with shock absorber 526 if desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:
 a pressure tube forming a working chamber;
 a pressurized gas disposed within said working chamber;
 a piston disposed within said working chamber, said piston dividing said working chamber into an upper working chamber and a lower working chamber;
 a reservoir of said pressurized gas in communication with said working chamber;
 a first fluid line extending between said reservoir and said upper working chamber;
 a first valve disposed within said first fluid line;
 a second fluid line extending between said reservoir and said lower working chamber:
 a second valve disposed within said second fluid line; and
 a first control unit in communication with said first and second valves, said control unit opening and closing said first and second valves; wherein
 there is no fluid communication between said first fluid line and said second fluid between said reservoir and said pressure tube.

2. The damper according to claim 1 further comprising:
 a third valve for controlling flow of said pressurized gas through said piston; and
 a second control unit in communication with said third valve, said second control unit opening and closing said third valve.

3. The damper according to claim 1 further comprising a third valve disposed within said reservoir, said third valve dividing said reservoir into an upper reservoir and a lower reservoir, said first valve being disposed between said upper reservoir and said upper working chamber, said second valve being disposed between said lower reservoir and said upper working chamber, said first control unit being in communication with said third valve, said first control unit opening and closing said third valve.

4. The damper according to claim 3 further comprising:
 a fourth valve for controlling flow of said pressurized gas through said piston; and
 a second control unit in communication with said fourth valve, said second control unit opening and closing said fourth valve.

5. The damper according to claim 1 wherein said reservoir comprises a first reservoir and a second reservoir, said first valve being disposed between said first reservoir and said upper working chamber, said second valve being disposed between said second reservoir and said lower working chamber.

6. The damper according to claim 5 further comprising:
 a third valve for controlling flow of said pressurized gas through said piston; and
 a second control unit in communication with said third valve, said second control unit opening and closing said third valve.

7. The damper according to claim 1 further comprising a sensor monitoring an operating condition associated with said damper, said first control unit being in communication with said sensor for opening and closing said first and second valves based upon said operating condition monitored by said sensor.

* * * * *